(12) United States Patent
Adler et al.

(10) Patent No.: US 10,900,610 B2
(45) Date of Patent: Jan. 26, 2021

(54) APPARATUS AND METHOD FOR COMPRESSING EVAPORATED GAS

(71) Applicant: CRYOSTAR SAS, Hesingue (FR)

(72) Inventors: Robert Adler, Gerasdorf (AT); Ekkehardt Klein, Katzelsdorf (AT); Christoph Nagl, Alland (AT); Lukas Tobeiner, Breitenfurt bei Wien (AT)

(73) Assignee: Cryostar SAS, Hessingue (FR)

( * ) Notice: Subject to any disclaimer, the term of this patent is extended or adjusted under 35 U.S.C. 154(b) by 182 days.

(21) Appl. No.: 16/070,887

(22) PCT Filed: Jan. 10, 2017

(86) PCT No.: PCT/EP2017/025001
§ 371 (c)(1),
(2) Date: Jul. 18, 2018

(87) PCT Pub. No.: WO2017/125251
PCT Pub. Date: Jul. 27, 2017

(65) Prior Publication Data
US 2019/0032851 A1 Jan. 31, 2019

(30) Foreign Application Priority Data
Jan. 18, 2016 (GB) .................. 1600904.5

(51) Int. Cl.
| F25J 1/00 | (2006.01) |
| F17C 5/06 | (2006.01) |
| F17C 7/00 | (2006.01) |
| F17C 7/02 | (2006.01) |
| F17C 9/00 | (2006.01) |
| F17C 5/00 | (2006.01) |
| F17C 9/02 | (2006.01) |

(52) U.S. Cl.
CPC ............. *F17C 7/02* (2013.01); *F17C 5/007* (2013.01); *F17C 5/06* (2013.01); *F17C 7/00* (2013.01);
(Continued)

(58) Field of Classification Search
CPC ........ F25J 1/0025; F25J 2210/90; F17C 5/06; F17C 7/00
See application file for complete search history.

(56) References Cited

U.S. PATENT DOCUMENTS 1,797,245 A * 3/1931 Schaer .................. F04B 9/107
417/387
4,522,159 A * 6/1985 Engel ............... B60K 15/03006
123/1 A
(Continued)

FOREIGN PATENT DOCUMENTS

| EP | 1030971 B1 | 7/2004 |
| EP | 1706646 B1 | 5/2010 |

(Continued)

OTHER PUBLICATIONS

International Search Report dated Mar. 17, 2017 issued in corresponding PCT/EP2017/025001 application (4 pages).

*Primary Examiner* — Frantz F Jules
*Assistant Examiner* — Erik Mendoza-Wilkenfel
(74) *Attorney, Agent, or Firm* — Millen White Zelano & Branigan, PC; Brion P. Heaney

(57) ABSTRACT

The invention provides an apparatus comprising a storage tank, a liquid piston compressor and a gas-fed device. The storage tank is configured to store liquefied gas therein. The liquid piston compressor is disposed downstream of, and in fluid communication with, the storage tank and is configured to receive boil-off gas from the storage tank and to compress the gas. The gas-fed device is disposed downstream of, and in fluid communication with, the liquid piston compressor, and is configured to receive compressed gas from the liquid piston compressor.

19 Claims, 2 Drawing Sheets

Figure 1:
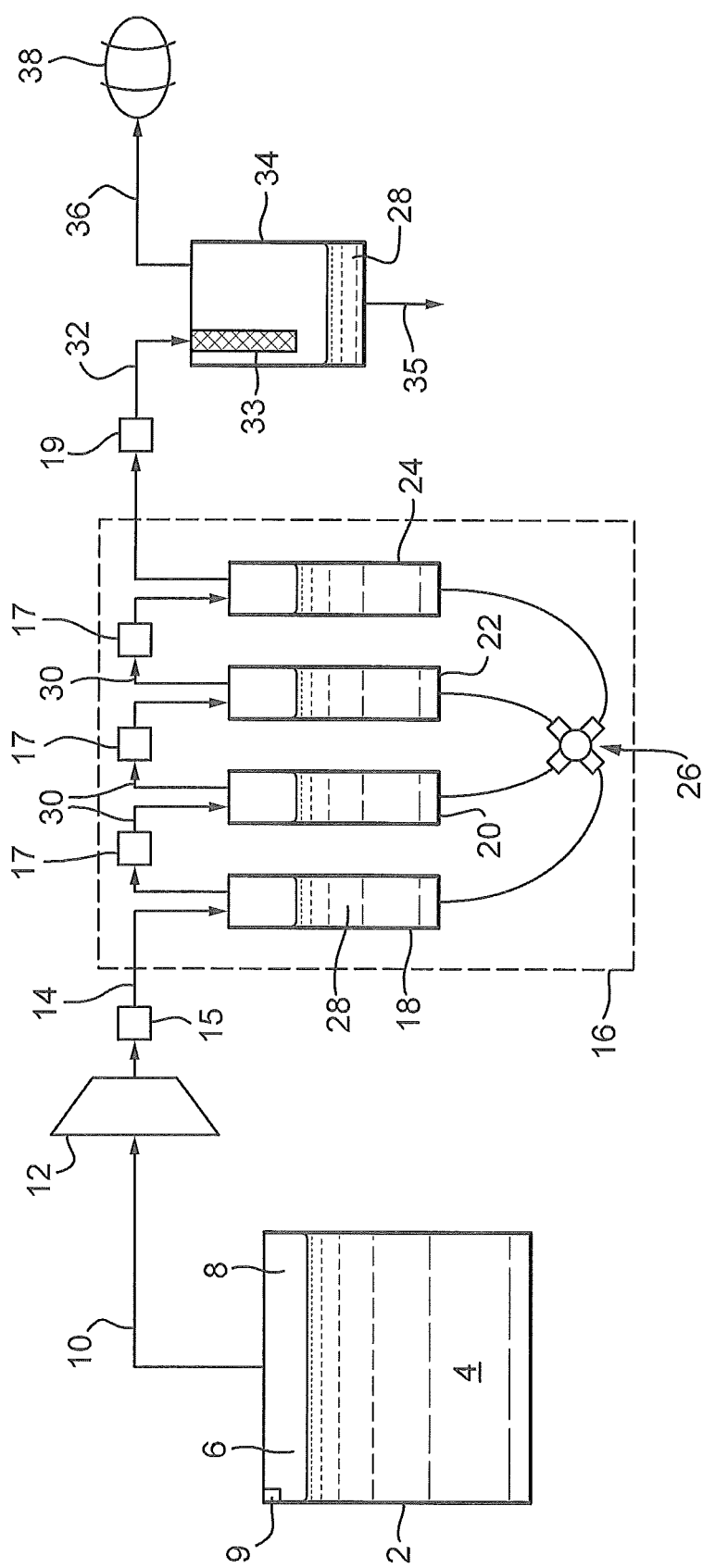

(52) U.S. Cl.
CPC .................. *F17C 9/00* (2013.01); *F17C 9/02* (2013.01); *F17C 2205/0341* (2013.01); *F17C 2221/012* (2013.01); *F17C 2221/033* (2013.01); *F17C 2223/0161* (2013.01); *F17C 2223/033* (2013.01); *F17C 2223/043* (2013.01); *F17C 2225/0123* (2013.01); *F17C 2225/035* (2013.01); *F17C 2225/036* (2013.01); *F17C 2227/0192* (2013.01); *F17C 2227/039* (2013.01); *F17C 2227/0337* (2013.01); *F17C 2250/043* (2013.01); *F17C 2250/0636* (2013.01); *F17C 2260/044* (2013.01); *F17C 2260/046* (2013.01); *F17C 2265/037* (2013.01); *F17C 2265/066* (2013.01); *Y02E 60/32* (2013.01)

(56) References Cited

U.S. PATENT DOCUMENTS

| | | |
|---|---|---|
| 5,863,186 A | 1/1999 | Green et al. |
| 5,884,488 A | 3/1999 | Gram et al. |
| 6,746,220 B2 * | 6/2004 | Norheim ............... B60T 11/236 417/552 |
| 2003/0039554 A1 | 2/2003 | Krasnov |
| 2008/0008602 A1 | 1/2008 | Pozivil et al. |
| 2008/0230998 A1 * | 9/2008 | Adler ..................... F16J 15/40 277/434 |
| 2011/0103976 A1 * | 5/2011 | Fejzuli ................. F04B 39/045 417/53 |
| 2012/0301328 A1 * | 11/2012 | Adler .................... F04B 9/1176 417/246 |
| 2014/0338370 A1 * | 11/2014 | Barker ..................... F17C 5/02 62/47.1 |
| 2015/0013829 A1 * | 1/2015 | Kuehl ....................... F17C 5/06 141/4 |
| 2015/0345706 A1 | 12/2015 | Whiteman et al. |

FOREIGN PATENT DOCUMENTS

| | | |
|---|---|---|
| WO | 03/019016 A1 | 3/2003 |
| WO | 2014/094070 A1 | 6/2014 |
| WO | 2015/118261 A1 | 8/2015 |

* cited by examiner

APPARATUS AND METHOD FOR COMPRESSING EVAPORATED GAS

The present invention is concerned with apparatus and methods for compressing evaporated or boil-off gas, and in particular to apparatus and methods for compressing and subsequently utilising an evaporated or boil-off gas from a liquefied gas store.

Natural gas is a fossil fuel used as a source of energy for heating, cooking, and electricity generation. It is also used as fuel for vehicles and as a chemical feedstock in the manufacture of plastics and other commercially important organic chemicals.

To enable storage and transport, natural gas may be liquefied, thereby reducing the volume it occupies to about $\frac{1}{600}^{th}$ of the volume of the same amount of natural gas in the gaseous state. The gas is then stored in insulated tanks at about atmospheric pressure and at a temperature of about −162° C. Large quantities of this liquefied natural gas (LNG) can be transported in the insulated tanks on cargo ships. It will be appreciated that the effectiveness of the insulation on these tanks is limited due to costs and limitations in the technology. Accordingly, while introduction of heat into the tanks can be reduced, it cannot be altogether avoided.

Over time, this gradual introduction of heat causes some of the LNG to evaporate, or boil-off. To prevent the pressure in the tanks from increasing to an unsafe level, this boil-off gas has to be removed from the tank, and this can be achieved by venting the tank to the atmosphere. However, the LNG is an economically valuable product, and so loss of large quantities due to venting to the atmosphere is commercially undesirable. Additionally, natural gas consists primarily of methane, which is a greenhouse gas, and so venting this to the atmosphere is also undesirable from an environmental point of view. Alternatively, it is possible to re-liquefy the boil-off gas, and return the liquefied natural gas to the tank. However, this can be technically complex and could lead to large running costs which would not be desirable.

The present invention arises from the inventors' work in trying to overcome the problems associated with the prior art.

In a first aspect of the invention, there is provided an apparatus comprising a storage tank configured to store liquefied gas therein; a liquid piston compressor disposed downstream of, and in fluid communication with, the storage tank and configured to receive boil-off gas from the storage tank and to compress the gas; and a gas-fed device disposed downstream of, and in fluid communication with, the liquid piston compressor, wherein the gas-fed device is configured to receive compressed gas from the liquid piston compressor.

As explained above, it is inevitable that some heat is introduced into the storage tank. Accordingly, when liquefied gas is disposed therein this heat may cause some of the liquefied gas to evaporate. The term "boil-off gas" may therefore be understood to refer to a gas which has been produced due to the liquefied gas evaporating in the storage tank.

Advantageously, the apparatus is configured to feed all boil-off losses to the gas-fed device. Advantageously, this prevents environmental pollution which would otherwise result from venting the boil-off losses to the atmosphere, and also utilises boil-off in the gas-fed device that would otherwise be wasted.

Preferably, the storage tank is configured to store a flammable liquefied gas. The flammable liquefied gas may comprise any flammable liquefied gas with a vapour/liquid equilibrium lower than the ambient temperature at a storage pressure lower than 10 bara, more preferably less than 9 bara, 8 bara, 7 bara or 6 bara, and most preferably less than 5 bara, 4 bara, 3 bara or 2 bara. The flammable liquefied gas may comprise liquefied hydrogen, liquefied natural gas (LNG), liquefied methane, liquefied ethane, and/or liquefied propane. Preferably, the storage tank is configured to store liquefied natural gas (LNG). Accordingly, it will be appreciated that if the storage tank is configured to store liquefied natural gas (LNG) then the boil-off gas comprises natural gas.

Preferably, the storage tank is configured to store the liquefied gas at a pressure of less than 10 bara, more preferably less than 9 bara, 8 bara, 7 bara or 6 bara, and most preferably less than 5 bara, 4 bara, 3 bara or 2 bara. In a most preferred embodiment, the storage tank is configured to store the liquefied gas at about atmospheric pressure.

The apparatus may comprise a plurality of storage tanks. The plurality of storage tanks may be arranged in parallel with one another.

Preferably, the apparatus comprises a pre-compressor. Preferably, the pre-compressor is disposed downstream of, and in fluid communication, with the storage tank. Preferably, the pre-compressor is disposed upstream of, and in fluid communication with, the liquid piston compressor. Preferably, the pre-compressor is configured to receive the boil-off gas from the storage tank.

Preferably, a conduit extends between the storage tank and the pre-compressor. Preferably, the conduit is configured to transport the boil-off gas from the storage tank to the pre-compressor.

Preferably, the pre-compressor is configured to increase the pressure of the boil-off gas to between 2 bara and 20 bara. More preferably, the pre-compressor is configured to increase the pressure of the boil-off gas to between 3 bara and 15 bara. Most preferably, the pre-compressor is configured to increase the pressure of the boil-off gas to between 4 bara and 10 bara.

Advantageously, the pre-compressor can raise the pressure of the gas from about atmospheric pressure to a higher pressure more efficiently than the liquid piston compressor.

The pre-compressor may comprise a compressor turbine, a multistage centrifugal compressor, a screw compressor, a pressure wave super charger or a positive displacement compressor. Preferably, the pre-compressor comprises a compressor turbine.

Preferably, in embodiments where a pre-compressor is present, the liquid piston compressor is configured to receive the boil-off gas from the pre-compressor. Preferably, a conduit extends between the pre-compressor and the liquid piston compressor. Preferably, the conduit is configured to transport the boil-off gas from the pre-compressor to the liquid piston compressor.

The apparatus may comprise a cooling device configured to cool the pre-compressed boil-off gas. Preferably, the cooling device is disposed between the pre-compressor and the liquid piston compressor. The cooling device may comprise a heat exchanger.

The liquid piston compressor may comprise one compressor stage. However, preferably the liquid piston compressor comprises a liquid piston multistage compressor comprising a plurality of compressor stages connected in a series.

Preferably, the liquid piston compressor comprises between one and twenty compressor stages. More preferably, the liquid piston compressor comprises between two and ten compressor stages. Most preferably, the liquid piston compressor comprises between three and five compressor stages.

In a most preferred embodiment, the liquid piston compressor comprises four compressor stages connected in series.

The liquid piston compressor may comprise a liquid piston multistage compressor comprising a plurality of compressor stages connected in parallel.

Advantageously, this would increase the throughput of the compressor.

Accordingly, in one embodiment, the liquid piston multistage compressor may a plurality of series, wherein each series comprises a plurality of compressor stages connected in a series and the plurality of series are connected parallel.

Preferably, each compressor stage comprises a chamber comprising a gas inlet configured to allow the boil-off gas to flow into the chamber, and a gas outlet configured to allow the boil-off gas to flow therefrom. Preferably, the gas inlet comprises a one-way valve. Preferably, the gas outlet comprises a one-way valve. The chamber may comprise a cylinder.

Preferably, the liquid piston multistage compressor comprises at least one intermediate conduit, wherein the or each intermediate conduit extends between two compressor stages. Preferably, the or each intermediate conduit extends between the gas outlet of one compressor stage and the gas inlet of a further compressor stage.

A cooling device configured to cool the boil-off gas may be disposed between each of the compressor stages connected in series. Accordingly, a cooling device may be disposed on the or each intermediate conduit. The cooling device may comprise a heat exchanger.

Preferably, each of the plurality of compressors is configured to increase the pressure of the boil-off gas received therein.

Preferably, each chamber is fluidly connected to a liquid high-pressure supply device configured to increase and decrease the amount of a driving liquid disposed in the chamber.

Each chamber may be connected to a separate liquid high-pressure supply device. Alternatively, a plurality of chambers could be connected to a common liquid high pressure supply device. In a preferred embodiment, each chamber in a series of chambers is connected to a common liquid high-pressure supply device.

The driving liquid may comprise an ionic liquid.

Each chamber may comprise a solid dummy piston configured to separate the driving liquid and the boil-off gas. Preferably, the dummy piston is configured to move within the chamber as the amount of the driving liquid disposed therein varies.

Each chamber may comprise a v-piston ring configured to provide a seal between a peripheral surface of the dummy piston and an inner surface of the chamber. Preferably, the v-piston ring is configured to move with the dummy piston, and thereby to maintain the seal as the dummy piston moves.

Alternatively, or additionally, each chamber may comprise an amount of an additional liquid configured to provide a seal between a peripheral surface of the dummy piston and an inner surface of the chamber. Preferably, the additional liquid is configured to move with the dummy piston, and thereby to maintain the seal as the dummy piston moves. The additional liquid may comprise an ionic liquid.

Preferably, the liquid piston compressor is configured to increase the pressure of the boil-off gas to between 100 bara and 1500 bara. More preferably, the liquid piston compressor is configured to increase the pressure of the boil-off gas to between 150 bara and 1250 bara. Most preferably, the liquid piston compressor is configured to increase the pressure of the boil-off gas to between 300 bara and 1000 bara.

It may be appreciated that the desired pressure of the boil-off gas varies depending upon the boil off gas. Accordingly, when the boil-off gas is hydrogen, the liquid piston compressor may be configured to increase the pressure of the boil-off gas to between 500 bara and 1500 bara, more preferably to between 700 bara and 1400 bara, and most preferably to between 800 bara and 1300 bara.

Alternatively, when the boil-off gas is natural gas, the liquid piston compressor may be configured to increase the pressure of the boil-off gas to between 100 bara and 700 bara, more preferably to between 200 bara and 600 bara, and most preferably to between 300 bara and 500 bara.

The apparatus may comprise liquid separation means configured to separate boil-off gas and the driving liquid. The liquid separation means may be disposed downstream of, and in fluid communication with, the liquid piston compressor. Preferably, a conduit extends between the liquid piston compressor and the liquid separation means. Preferably, the conduit is configured to transport the boil-off gas from the liquid piston compressor to the liquid separation means.

The liquid separation means may be disposed upstream of, and in fluid communication with, the gas-fed device. Preferably, a conduit extends between the liquid separation means and the gas-fed device. Preferably, the conduit is configured to transport the boil-off gas from the liquid separation means to the gas-fed device.

The liquid separation means may comprise a coalescing filter, a molecular sieve, a centrifugal separator or a metal hydride separator. Preferably, the separator comprises a coalescing filter.

Advantageously, the liquid separation means removes any driving liquid which is present in the compressed boil-off gas. This increases the purity of the boil-off gas received by the gas-fed device.

The liquid separation means may be in fluid communication with the liquid high pressure supply device. Preferably, a conduit extends between the liquid separation means and the liquid high pressure supply device. Preferably, the conduit is configured to transport recovered driving liquid from the liquid separation means to the liquid high pressure supply device.

A cooling device configured to cool the compressed boil-off gas may be disposed between liquid piston compressor and the gas-fed device. In embodiments where it is present, the cooling device may be disposed between the liquid piston compressor and the liquid separation means. The cooling device may comprise a heat exchanger.

The gas-fed device may comprise an engine or a fuel cell. Preferably, the gas-fed device comprises an engine. The engine may comprise a gas-fueled engine or a hybrid fuel engine. The engine may comprise a four-stroke engine or a two-stroke engine. Preferably, the engine comprises a two-stroke engine.

The engine may be configured to create a propulsive force. Alternatively, the engine may comprise an electrical generator.

The apparatus of the first aspect could be provided on a liquefied gas carrier vessel.

Accordingly, in accordance with the second aspect there is provided a liquefied gas carrier vessel comprising the apparatus of the first aspect.

Preferably, the liquefied gas carrier vessel is any vehicle, which moves across land, by air or water, such as a ship, aeroplane, automobile, train, zeppelin or lorry. Preferably, the vehicle is a ship.

Preferably, the gas-fed device is an engine configured to create a propulsive force and thereby move the liquefied gas carrier vessel.

Advantageously, the apparatus increases the efficiency of the liquefied gas carrier vessel in the course of liquefied gas transport.

In accordance with a third aspect, there is provided use of the apparatus of the first aspect to provide a gas-fed device with compressed gas.

In accordance with a fourth aspect, there is provided a method of providing a gas-fed device with compressed gas, the method comprising:
- feeding boil-off gas from a liquefied gas storage tank to a compressor comprising one or more liquid pistons;
- compressing the boil-off gas using the one or more liquid pistons; and
- feeding the compressed gas to the gas-fed device.

Preferably, the method of the fourth aspect uses the apparatus of the first aspect.

Preferably, prior to compressing the boil-off gas using one or more liquid pistons, the method comprises pre-compressing the gas to a pressure of between 2 bara and 20 bara, more preferably to between 3 bara and 15 bara, and most preferably to between 4 bara and 10 bara.

Pre-compressing the boil-off gas may comprise compressing the boil-off gas in a compressor turbine, a multistage centrifugal compressor, a screw compressor, a pressure wave super charger or a positive displacement compressor. Preferably, the step of pre-compressing the gas comprises compressing the gas in a compressor turbine.

The method may comprise cooling the pre-compressed gas. Cooling the pre-compressed gas may comprise passing the pre-compressed gas through a heat exchanger.

Preferably, the pre-compressed gas is then further compressed by the one or more liquid pistons. Preferably, compressing the boil-off gas with a liquid piston comprises feeding the boil-off gas into a chamber and feeding a driving liquid into the chamber to thereby compress the gas.

Preferably, compressing the boil-off gas using one or more liquid pistons comprises compressing the gas with a series of liquid pistons, wherein each liquid piston is configured to further compress the boil-off gas.

The method may comprise cooling the gas between each liquid piston in the series of liquid pistons. Cooling the gas may comprise passing the pre-compressed gas through a heat exchanger.

The method may comprise splitting the flow of gas into a plurality of streams upstream of the one or more liquid pistons. Each of the plurality of streams may then be compressed, in parallel, by one or more liquid pistons. Preferably, each of the plurality of streams is compressed by a series of liquid pistons, wherein each liquid piston is configured to further compress the boil-off gas.

Preferably, compressing the boil-off gas with the one or more liquid pistons comprises compressing the boil-off gas with between one and twenty liquid pistons in series, more preferably between two and ten liquid pistons in series, most preferably, between three and five liquid pistons in series.

The method may comprise cooling the gas subsequent to the step of compressing the boil-off gas with the one or more liquid pistons. Cooling the compressed gas may comprise passing the pre-compressed gas through a heat exchanger.

Preferably, compressing the boil-off gas with the one or more liquid pistons comprises compressing the boil-off gas to a pressure between 100 bara and 1500 bara, more preferably to between 150 bara and 1250 bara, most preferably to between 300 bara and 1000 bara.

In an embodiment where the boil-off gas is hydrogen, the method may comprise compressing the boil-off gas to a pressure between 500 bara and 1500 bara, more preferably to between 700 bara and 1400 bara, and most preferably to between 800 bara and 1300 bara.

In an embodiment where the boil-off gas is natural gas, the method may comprise compressing the boil-off gas to a pressure between 100 bara and 700 bara, more preferably to between 200 bara and 600 bara, and most preferably to between 300 bara and 500 bara.

Preferably, subsequent to compressing the boil-off gas with the one or more liquid pistons and prior to feeding the compressed gas into the gas-fed device, the method comprises separating the boil-off gas and the driving liquid. Separating the boil-off gas and the driving liquid may comprise feeding the boil-off gas through a coalescing filter, a molecular sieve, a centrifugal separator or a metal hydride separator. Preferably, separating the boil-off gas and the driving liquid may comprise feeding the boil-off gas through a coalescing filter.

Subsequent to feeding the compressed gas into the gas-fed device, the method may comprise combusting the compressed gas. The method may comprise using the heat energy produced by combusting the gas to create a propulsive force or electricity.

All features described herein (including any accompanying claims, abstract and drawings), and/or all of the steps of any method or process so disclosed, may be combined with any of the above aspects in any combination, except combinations where at least some of such features and/or steps are mutually exclusive.

For a better understanding of the invention, and to show how embodiments of the same may be carried into effect, reference will now be made, by way of example, to the accompanying Figures, in which:—

Figure 2:
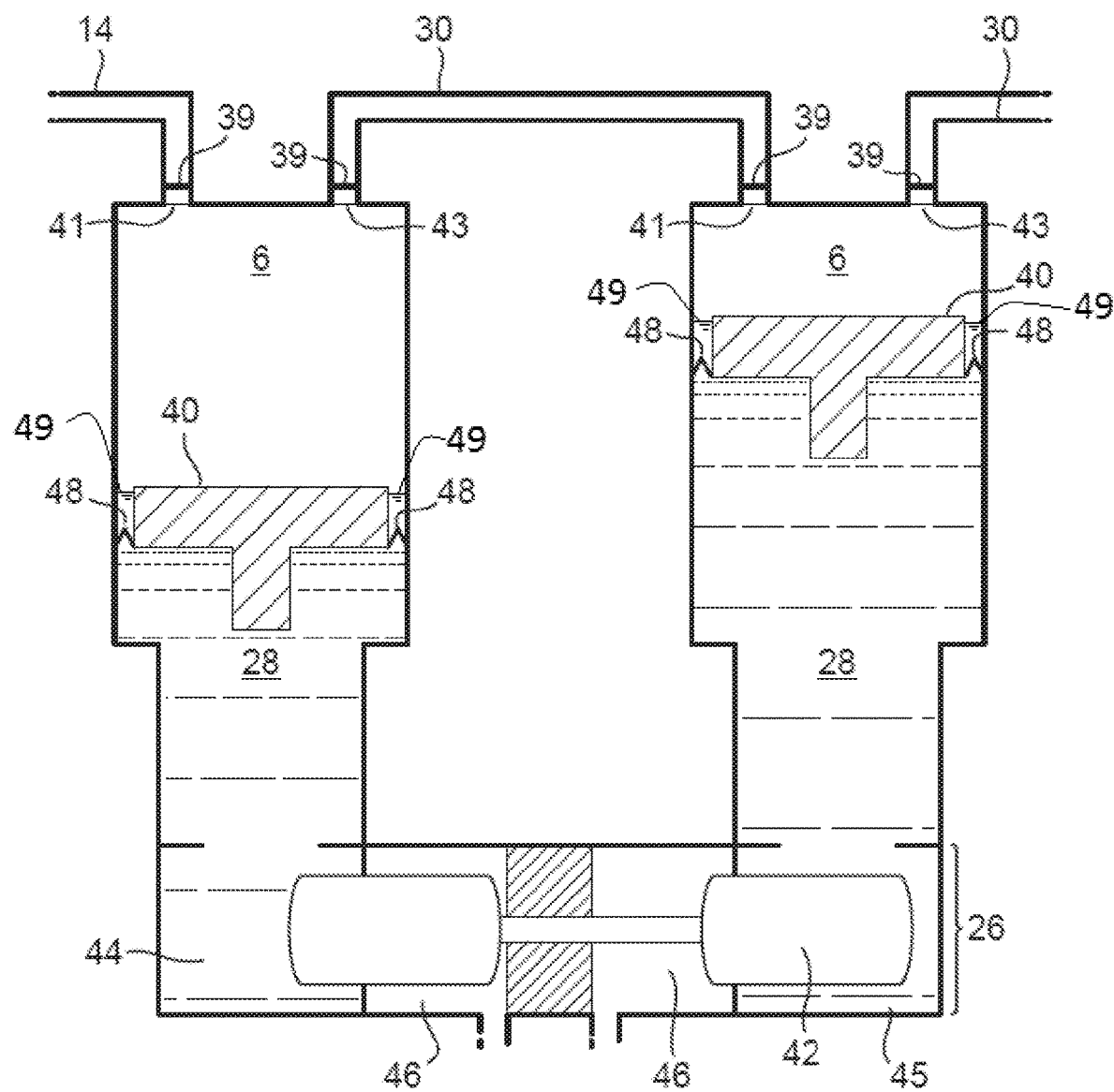

FIG. 1 is a schematic diagram of an embodiment of a gas storage and compression apparatus according to the invention; and FIG. 2 is a schematic diagram of a liquid piston compressor comprising dummy pistons.

EXAMPLE 1

A liquefied natural gas (LNG) tank 2 containing liquefied natural gas (LNG) 4 is disposed on-board a vehicle, for example a cargo ship. While not illustrated, it will be appreciated that multiple interconnected tanks 2 could be disposed on the cargo ship. The LNG 4 is stored at about atmospheric pressure and at a temperature of about −162° C.

Despite the tank 2 being insulated, some heat will be transferred to the LNG 4 and this will cause some of the LNG 4 to evaporate, producing a boil-off gas 6 which will be disposed in a headspace 8 of the tank 2. The boil-off gas 6 passes from the headspace 8 to a compressor turbine 12 along a conduit 10 extending therebetween.

While not shown, it will be appreciated that the flow of boil-off gas 6 along the conduit 10 could be controlled by a regulatable device, such as an adjustable control valve. The device could be configured to increase the flow of boil-off gas along the conduit 10 in line with demand from an engine 38. Alternatively, the device could be configured to increase the flow of boil-off gas along the conduit 10 when a sensor 9 detects that the pressure within the tank has increased above a predetermined maximum pressure.

Advantageously, this prevents the pressure within the tank exceeding a maximum pressure.

The gas 6 will be at about atmospheric pressure when it reaches the compressor turbine 12. The compressor turbine 12 is a multistage turbine with a compression ratio of 0.5-3:1 per stage. The compressor turbine 12 compresses the boil-off gas 6 to a pressure of about 6 bara (i.e. the absolute pressure is 6 bar). The compressed gas 6 is then fed along a conduit 14 extending between the compressor turbine 12 and a liquid piston multistage compressor 16. A heat exchanger 15 is disposed on the conduit 14 and is configured to cool the boil-off gas 6.

In the illustrated embodiment, the liquid piston multistage compressor 16 comprises four compressor stages 18, 20, 22, 24 each of which comprise cylinders which are serially connected in a chain by intermediate conduits 30. Accordingly, the first compressor stage 18 compresses gas 6 outputted by the turbine compressor 12, and each subsequent compressor stage 20, 22, 24 compresses gas 6 outputted by the preceding compressor stage in the chain.

Each one of the compressor stages 18, 20, 22, 24 is connected to a high-pressure driving liquid supply device 26. In the illustrated embodiment, all of the compressor stages 18, 20, 22, 24 share one supply device 26. However, it will be appreciated that in alternative embodiments, the apparatus can comprise multiple supply devices 26. The supply device 26 is configured to vary the amount of a driving liquid 28 contained in each of the compressor stages 18, 20, 22, 24.

The structure of liquid piston compressor stages is well-known. Accordingly, it will be appreciated that the supply device 26 causes the level of the driving liquid 28 to vary repeatedly within each compressor stage 18, 20, 22, 24, and this is described in more detail below. Accordingly, the multistage compressor 16 is configured such that the pressure of the gas 6 increases as it passes through subsequent compressor stages 18, 20, 22, 24.

The extent to which the gas 6 is compressed depends on a variety of factors including the magnitude of the level variation of the driving liquid within the cylinder. The compressor stages 18, 20, 22, 24 are configured to increase the pressure of the gas 6 as set out in table 1.

TABLE 1

| Outlet pressure of each compressor stage 18, 20, 22, 24 | |
| --- | --- |
| Compressor stage | Outlet pressure (bara) |
| 18 | 16.6 |
| 20 | 45.7 |
| 22 | 126 |
| 24 | 350 |

The driving liquid 28 comprises a non-compressible liquid, such as an ionic liquid.

It will be appreciated that as the gas 6 is compressed, heat is produced. Advantageously, this heat will be transferred to the driving liquid 28 which can be cooled in a heat exchanger (not shown). Additionally heat exchangers 17 are also provided on each of the intermediate conduits 30 to further cool the gas 6.

The gas 6 may become contaminated with the driving liquid 28. Accordingly, a conduit 32 extends between the last (i.e. fourth) compressor stage 24 in the chain and a coalescing filter 34. A final heat exchanger 19 is provided on the conduit 32 to cool the gas 6. The gas 6 enters the coalescing filter 34 at a relatively high speed. The gas 6 is then passed through an element 33 with a high cross-sectional area. This reduces the speed of the gas 6 and causes the driving liquid to be deposited as drop within the element 33. As the gas 6 flows through the element 33 the drops are forced out of the element and they drain to the bottom of the coalescing filter 34 due to gravity. Accordingly, the coalescing filter 34 separates the gas 6 from the driving liquid 28. The recovered driving liquid 28 can be removed from the coalescing filter 34 by drain 35. It can then be reinjected back into the liquid piston multistage compressor 16.

A conduit 36 extends between the coalescing filter 34 and an engine 38. The engine 38 can be a gas-fueled engine or a hybrid-fueled engine. The engine 38 is configured to create a propulsive force, and thereby drive the vehicle, in this case the cargo ship. The engine 38 is gas-fed from the conduit 36, supplementing any other fuel which is received by the engine 38, thus allowing the cargo ship to function more efficiently.

EXAMPLE 2

Alternative Embodiments

In the embodiment illustrated in FIG. 1, there is direct contact between the driving liquid 28 and the gas 6 within each compressor stage 18, 20, 22, 24. However, it will be appreciated that if there was no direct contact then this would avoid polluting the compressed gas 6 with vapour from the driving liquid 28.

For instance, with reference to FIG. 2, document US 2012/0134851 proposes arranging a dummy solid piston 40 between the driving liquid 28 and the gas 6. One example of first and second compressor stages 18, 20 comprising dummy pistons 40 is shown in FIG. 2. In this embodiment, gas 6 is introduced to the compressor stages 18 through a gas inlet 41 comprising a one-way valve 39. A plunger 42, lubricated by hydraulic oil 46, moves from side to side and thereby varies the amount of driving liquid 28 located in reservoirs 44, 45 disposed below each compressor stages 18, 20.

Accordingly, as the plunger 42 moves towards the left, driving liquid 28 in reservoir 44 will be displaced and will flow into the first compressor stage 18, thereby causing the dummy piston 40 disposed therein to rise. This in turn will compress the gas 6 disposed in the first compressor stage 18 and cause it to flow through a gas outlet 43 comprising a one-way valve 39 into an intermediate conduit 30.

At the same time, due to the movement of the plunger out of reservoir 45, driving liquid 28 disposed in the second compressor stage 20 will flow into the reservoir 45, thereby causing the dummy piston 40 disposed in the second compressor stage 20 to fall. Accordingly, gas 6 disposed in the intermediate conduit 30 will flow through the gas inlet 41 into the second compressor stage 20. Accordingly, it will be appreciated that the plunger 42 and reservoirs 44, 45 comprise the high-pressure driving liquid supply device 26.

During an operation cycle, the dummy piston 40 remains on top of the driving liquid 28 and moves up and down due to the variation in the level thereof. As is shown in FIG. 2, dummy pistons 40 within separate compressor stages 18, 20 are independent from each other, without solid-based inter-connections.

V-piston rings 48 are used to provide sealing between the peripheral surface of the dummy piston 40 and the inner surface of the compressor stage 18, 20. The v-piston rings 48 move with the dummy piston 40 to maintain the seal as the dummy piston 40 moves.

Alternatively, or additionally, a fixed amount of an additional liquid 49 could be provided for producing the peripheral sealing between the dummy piston 40 and the inner surface of the compressor stage 18, 20. This amount of additional liquid 49 would remain comprised between the peripheral surface of the dummy piston 40 and the inner surface of the compressor stage 18, 20 whatever the level of the driving liquid 28 by moving together with the dummy piston. The additional liquid 49 is selected for not producing polluting vapours and so that the gas 6 does not dissolve therein or react therewith. Ionic liquids have been implemented for this purpose.

It will be appreciated that in this embodiment the apparatus would not need to comprise the coalescing filter 34, because the compressed gas 6 cannot be polluted with vapour from the driving liquid 28.

In a further alternative embodiment, the engine 38 comprises an electrical generator.

In the above embodiment the tank 2 is configured to store liquefied natural gas (LNG). However, it will be appreciated that the tank could store any flammable liquefied gas with a vapour/liquid equilibrium lower than the ambient temperature at a storage pressure lower than 10 bara. Accordingly, in alternative embodiments, the tank 2 could be configured to store liquefied hydrogen, methane, ethane and/or propane.

Finally, while Example 1 has described the apparatus on board a cargo ship, it will be appreciated that similar apparatus could be disposed on alternative vehicles or carriers. Alternatively, the apparatus could be applied to a stationary structure where LNG is stored, such as a power plant.

SUMMARY

The apparatus of the present invention is configured to use all boil-off losses in an internal combustion engine. Advantageously, this prevents environmental pollution which would otherwise result from venting the boil-off losses to the atmosphere. Additionally, the apparatus increases the efficiency of the cargo ship in the course of LNG transport.

The high efficiency of the liquid piston compressor may lead to economic advantages, as the method of compressing and combusting the gas may be more cost-effective than re-liquefying the gas. Additionally, the gas fed to the engine will be high quality due to the coalescing filter resulting in a low vapour pressure of the gas when it is fed into the engine.

The invention claimed is:

1. An apparatus comprising:
a storage tank configured to store liquefied gas therein;
a liquid piston multistage compressor disposed downstream of, and in fluid communication with, the storage tank and configured to receive boil-off gas from the storage tank and to compress the boil-off gas; and
a gas-fed device disposed downstream of, and in fluid communication with, the liquid piston multistage compressor,
wherein the gas-fed device is configured to receive compressed gas from the liquid piston multistage compressor,
wherein the liquid piston multistage compressor comprises a plurality of compressor stages connected in series, each compressor stage comprising a chamber, wherein each chamber comprises a solid dummy piston configured to separate a driving liquid and the boil-off gas, and an amount of an additional liquid, separate from the driving liquid, configured to provide a seal between a peripheral surface of the dummy piston and an inner surface of the chamber,
wherein each chamber further comprises a v-piston ring configured to move with the dummy piston and configured to provide a seal between the peripheral surface of the dummy piston and the inner surface of the chamber.

2. The apparatus according to claim 1, wherein the storage tank is configured to store a flammable liquefied gas comprising liquefied hydrogen, liquefied natural gas, liquefied methane, liquefied ethane and/or liquefied propane.

3. The apparatus according to claim 1, wherein the storage tank is configured to store the liquefied gas at a pressure of less than 10 bara.

4. The apparatus according to claim 1, further comprising a pre-compressor configured to receive the boil-off gas from the storage tank and to pressurize the boil-off gas to a pressure between 2 bara and 20 bara, wherein the pre-compressor is disposed downstream of, and in fluid communication with, the storage tank, and disposed upstream of, and in fluid communication with, the liquid piston multistage compressor.

5. The apparatus according to claim 1, wherein the liquid piston multistage compressor is configured to pressurize the boil-off gas to a pressure between 100 bara and 1500 bara.

6. The apparatus according to claim 1, further comprising a liquid separation means configured to separate boil-off gas and the driving liquid, and the liquid separation means is disposed downstream of, and in fluid communication with, the liquid piston multistage compressor and upstream of, and in fluid communication with, the gas-fed device.

7. The apparatus according to claim 1, wherein the gas-fed device comprises a fuel cell or an engine.

8. A liquefied gas carrier vessel comprising the apparatus of claim 1.

9. A liquefied gas carrier vessel according to claim 8, wherein the liquefied gas carrier vessel is a ship, airplane, automobile, train, zeppelin or lorry, and the gas-fed device is an engine configured to create a propulsive force and thereby move the liquefied gas carrier vessel.

10. A method for providing a device with compressed gas, comprising using the apparatus according to claim 1 to feed compressed gas to said gas-fed device.

11. A method of providing a gas-fed device with compressed gas, the method comprising:
feeding boil-off gas from a liquefied gas storage tank to a liquid piston multistage compressor comprising a plurality of compressor stages connected in series, each compressor stage comprising a chamber, each chamber comprising a solid dummy piston configured to separate a driving liquid and the boil-off gas, an amount of an additional liquid, separate from the driving liquid, configured to provide a seal between a peripheral surface of the dummy piston and an inner surface of the chamber, and a v-piston ring configured to move with the dummy piston and configured to provide a seal between the peripheral surface of the dummy piston and the inner surface of the chamber;
compressing the boil-off gas using the plurality of compressor stages; and
feeding the compressed boil-off gas to the gas-fed device.

12. The method according to claim 11, wherein, prior to compressing the boil-off gas using the plurality of compressor stages, the method further comprises pre-compressing the boil-off gas to a pressure of between 2 bara and 20 bara.

13. The method according to claim 11, wherein each of the plurality of compressor stages is configured to further compress the boil-off gas, and the boil-off gas is compressed to a pressure between 100 bara and 1500 bara using the plurality of compressor stages.

14. The A method according to claim 11, wherein subsequent to compressing the boil-off gas with the plurality of compressor and prior to feeding the compressed boil-off gas into the gas-fed device, the method further comprises separating the boil-off gas and the driving liquid.

15. The apparatus according to claim 4, wherein the liquid piston multistage compressor is configured to pressurize the boil-off gas to a pressure between 100 bara and 1500 bara.

16. The apparatus according to claim 4, wherein the pre-compressor is configured to pressurize the boil-off gas to a pressure between 3 bara and 15 bara, and the liquid piston multistage compressor is configured to pressurize the boil-off gas to a pressure between 150 bara and 1250 bara.

17. The apparatus according to claim 4, wherein the pre-compressor is configured to pressurize the boil-off gas to a pressure between 4 bara and 10 bara, and the liquid piston multistage compressor is configured to pressurize the boil-off gas to a pressure between 300 bara and 1000 bara.

18. The apparatus according to claim 1, further comprising a liquid supply device and each of said chambers is fluidly connected to the liquid supply device, wherein said liquid supply device is configured to increase or decrease the amount of the driving liquid disposed in the individual chambers.

19. An apparatus comprising:

a storage tank configured to store liquefied gas therein;

a liquid piston multistage compressor disposed downstream of, and in fluid communication with, the storage tank and configured to receive boil-off gas from the storage tank and to compress the boil-off gas; and a gas-fed device disposed downstream of, and in fluid communication with, the liquid piston multistage compressor, wherein the gas-fed device is configured to receive compressed gas from the liquid piston multistage compressor, wherein the liquid piston multistage compressor comprises a first group of a plurality of compressor stages connected in series and a second group of a plurality compressor stages connected in series, wherein said first group and said second group operate in parallel, each compressor stage comprising a chamber, wherein each chamber comprising a solid dummy piston configured to separate a driving liquid and the boil-off gas, an amount of an additional, separate from the driving liquid, liquid configured to provide a seal between a peripheral surface of the dummy piston and an inner surface of the chamber, and a v-piston ring configured to move with the dummy piston and configured to provide a seal between the peripheral surface of the dummy piston and the inner surface of the chamber.

\* \* \* \* \*